May 10, 1932.  J. HOJNOWSKI  1,857,849
HELICOPTER
Filed March 17, 1931
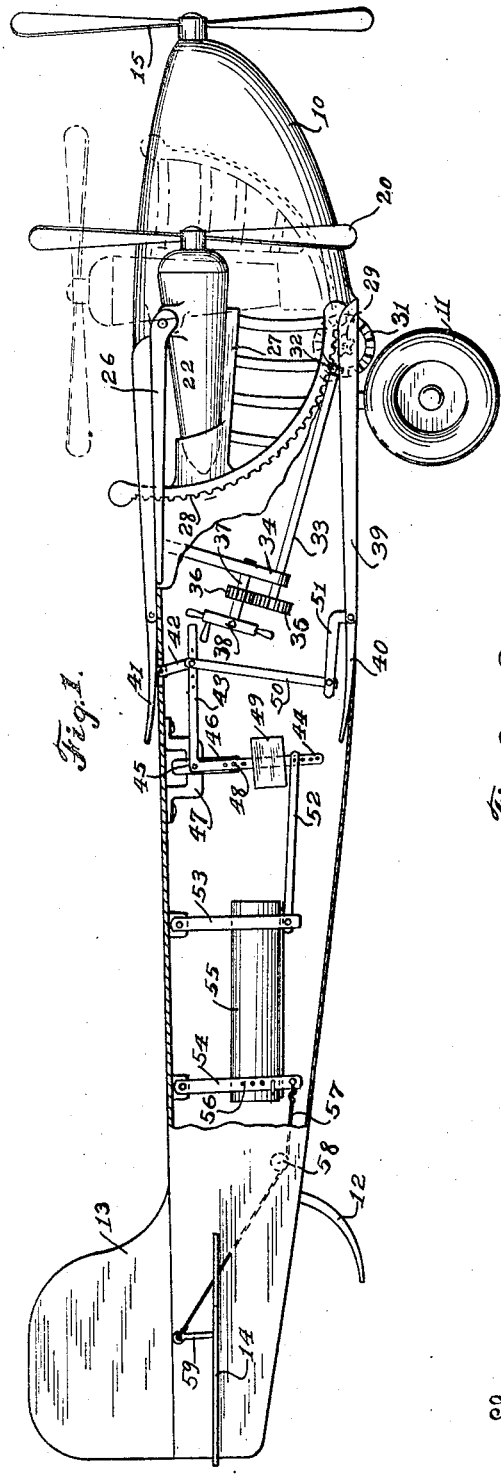
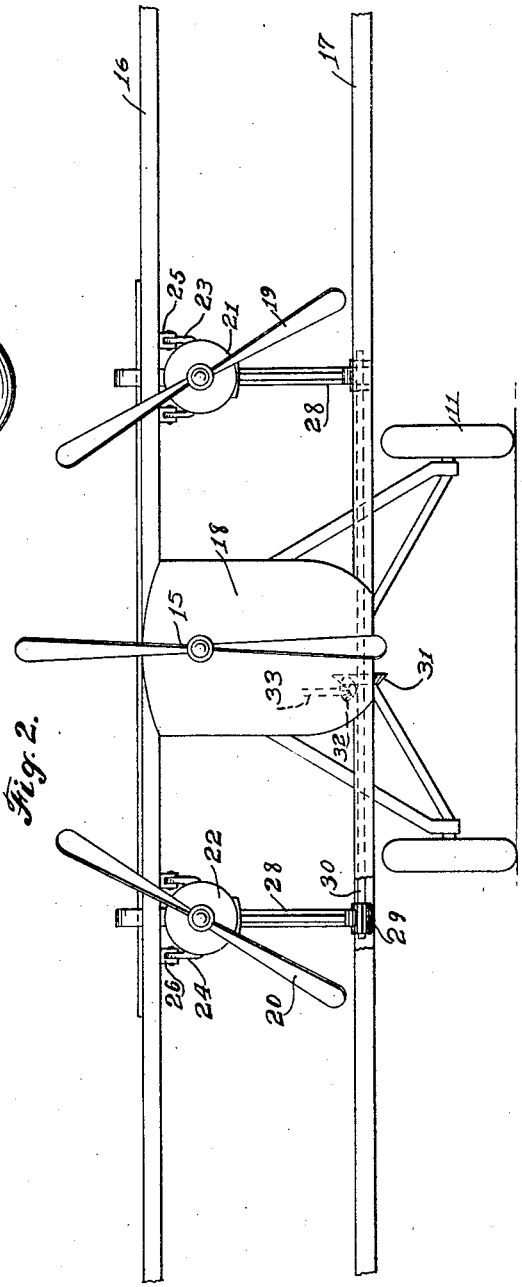
Inventor
Jakob Hojnowski
By Attorney Patented May 10, 1932

1,857,849

UNITED STATES PATENT OFFICE

JAKOB HOJNOWSKI, OF NEKOOSA, WISCONSIN

HELICOPTER

Application filed March 17, 1931. Serial No. 523,359½.

My invention relates to improvements in aircraft preferably of the heavier than air type, however, applicable also to aircraft of the lighter than air type.

It is the principal object of my invention to provide an aircraft preferably of the helicopter type with means for maintaining the equilibrium of the machine at all times.

Another object of my invention is the provision of an aircraft with means to readily swing a plurality of driving propellers into a position in which they act as lifting and sustaining means for the aeroplane.

A further object of my invention is the provision of a helicopter of comparatively simple and therefore inexpensive construction, yet durable and efficient in its operation.

A still further object of my invention is the provision of aircraft of the character set forth above equipped with weights for automatically balancing the craft in case it is threatening to go into a head or tail spin.

These and other objects and advantages of my invention will become more fully known as the description thereof proceeds, and will then be specifically defined in the appended claims.

In the accompanying drawings forming a material part of this disclosure:

Fig. 1 is a sectional side elevation of an aircraft constructed according to my invention, parts being broken away to more clearly illustrate the inner construction.

Fig. 2 is a front end elevation thereof.

As shown on the drawings, the aeroplane has the usual body 10 on front landing gear 11 and rear landing fin 12, vertical rudder 13, horizontal rudder 14, driving propeller 15, wings 16, 17, and motor 18.

According to my invention, to both sides of the central engine 18 and propeller 15, auxiliary propellers 19, 20, and engines or motors 21, 22, are mounted in the fuselage. The auxiliary engines 21, 22 are each provided with pairs of lateral ears 23, 24, by means of which they are suspended from supports 25, 26. The engines 21, 22, are supported by supports 27, the lower and rear ends of which are connected by segmental racks 28 in mesh with gears 29 on a shaft 30 which carries also a large bevel gear 31.

In mesh with bevel gear 31 is a smaller bevel gear 32 at the end of an inclined shaft 33 rotating in a hanger bearing 34, and projecting rearwardly therethrough.

The inner end of shaft 33 carries a gear 35 with which meshes a gear 36 on a stub shaft 37, the outer end of which carries an operating wheel 38. Shaft 30 is supported at the front end of a support 39, and the outer ends of supports 26 and 39 have pivotally secured thereto members 40, 41. To member 41 a link 42 is pivotally secured at one end the other end of which is pivoted to the horizontal arm 43 of a bracket the other substantially vertical arm 44 of which is fulcrumed as at 45 to a guide piece 46 suspended from a bracket 47 secured to, and depending into body 10. Arm 44 is provided with a plurality of holes 48 allowing an adjustment of a weight 49 on arm 44. To arm 43 is pivotally attached the upper end of a bar 50, the lower end of which is pivoted to a member 51 pivoted to member 39 at the inner end thereof.

To the lower end of arm 44 a rod 52 is secured at one end by means of a pin passing through holes 48. The other end of rod 52 is pivotally secured to the lower end of a hanger bar 53 pivoted at its upper end to the inner upper wall of body 10.

Another hanger 54 is also pivoted at its upper end and suspended from the upper inner wall of body 10. Hangers 53, 54, support a fuel tank 55. Hanger 54 is equipped with a plurality of openings or holes 56 in one of which a pin is held to which one end of a cable 57 is secured guided over a roller 58 and attached at its outer end to a pin 59 of the horizontal rudder 14.

The operation of my device will be clearly understood from the above description and simultaneously inspection of the drawings, and it will be clear that the proper operation of wheel 38 will allow a swinging of propellers 19, 20, in and out of their position in which they act as helicopters, while the weight 49 will tend to balance the craft if the same shows an inclination to fore or aft in order to avoid head and tail spins.

It will be understood that I may make such changes in the construction described and shown as come within the scope of the appended claims without departure from my invention.

Having thus described my invention, what I claim as new and desire to secure by Letters Patent is:

1. In an aircraft of the class described including its horizontal rudder, a means for balancing the aircraft against tilting to fore and aft, including a perforated and weighted arm, a pair of hangers pivotally suspended at their upper ends, connections between said hangers and said perforated arm, a fuel tank on said hangers and flexible connections between said hangers and said horizontal rudder.

2. In an aircraft preferably of the helicopter type, having a horizontal rudder, a means for automatically maintaining the equilibrium of the craft comprising a dependinig bracket in the aircraft, a vertical arm having a plurality of perforations and movably attached to said bracket, a weight adjustably carried by said arm, a substantially horizontal rod having its inner end secured to said arm by a pin passing through the perforations in said arm, hanger bars pivotally suspended at their upper ends into the aircraft, a fuel tank supported by said hanger bars, the outer end of said rod pivoted to one of the hanger bars, the other of said bars having a plurality of perforations, a cable secured with its inner end in one of the perforations of said hanger bar, a roller over which said cable is guided and a pin on the horizontal rudder to which the outer end of said cable is secured, said weight and tank automatically balancing the aircraft to overcome declinations thereof from the horizontal.

Signed at Nekoosa, in the county of Wood and State of Wisconsin, this 9th day of September, A. D. 1931.

JAKOB HOJNOWSKI.